United States Patent [19]

Okura et al.

[11] Patent Number: 5,185,665
[45] Date of Patent: Feb. 9, 1993

[54] APPARATUS FOR GENERATING ANIMATED VIDEO INSERTIONS

[75] Inventors: Yukiko Okura, Tokyo; Yoshinori Komiya, Kanagawa, both of Japan

[73] Assignee: Sony Corporation, Tokyo, Japan

[21] Appl. No.: 664,779

[22] Filed: Mar. 5, 1991

[30] Foreign Application Priority Data

Mar. 6, 1990 [JP] Japan .................. 2-052801

[51] Int. Cl.⁵ .................. H04N 5/262; H04N 5/272
[52] U.S. Cl. ................................. 358/183; 358/185
[58] Field of Search .......................... 358/183, 185

[56] References Cited

U.S. PATENT DOCUMENTS 3,335,315  8/1967  Moore ................................. 315/18
4,821,102  4/1989  Ichikawa et al. ................... 358/142
5,016,112  5/1991  Nakajima et al. ............... 358/185 X

FOREIGN PATENT DOCUMENTS

3028223A1  2/1982  Fed. Rep. of Germany.

Primary Examiner—James J. Groody
Assistant Examiner—Mark R. Powell
Attorney, Agent, or Firm—Hill, Steadman & Simpson

[57] ABSTRACT

A video apparatus of the invention relates to some function, operation or the like in sets of plural character signals related to each other. When the function or the like is executed, each character within one set is output in sequence in a time series, such that the character can be expressed as if it were in movement in animation fashion on the display picture plane.

7 Claims, 5 Drawing Sheets

FIG. 5A
FIG. 5B
FIG. 5C
FIG. 5D
FIG. 6
PATTERN A  
PATTERN B  
PATTERN C  

APPARATUS FOR GENERATING ANIMATED VIDEO INSERTIONS

BACKGROUND OF THE INVENTION

1. Field of the Invention

The present invention relates to video apparatuses having a character display function.

2. Description of the Prior Art

In a video apparatus in the prior art, character signals generated from a character generator are added to image signals and the characters are displayed on a picture plane. Thus an image of function, log, operation content or the like can be expressed.

However, the character expression in the video apparatus of the prior art is such that a character (mark, log or the like) is fixed and displayed on the picture plane. Therefore the display is not rich in power of expression, and a problem exists in that a viewer frequently cannot understand what the character means.

In another video apparatus in the prior art, a display position of a character on a picture plane is varied in sequence so that the character is expressed as if it were in motion. In this case, however, since one fixed character is simply moved, its power of expression also has is limited.

In view of the above-mentioned problems in the prior art, the present invention provides a video apparatus where one set of a character group constituted by a plurality of characters related to each other corresponding to the prescribed function and operation is previously set, a means is provided which can output each character signal within one set in sequence for a prescribed time when the function is executed, and the character signal is added to a display signal such as an image signal.

BRIEF DESCRIPTION OF THE DRAWINGS

FIG. 5 is an explanation diagram of a character display state in a picture plane in an embodiment of a video apparatus of the invention for display by animation; and FIG. 6 is an explanation diagram of characters in another embodiment of a video apparatus of the invention for display by animation.

DESCRIPTION OF THE PREFERRED EMBODIMENTS

Figure 1:
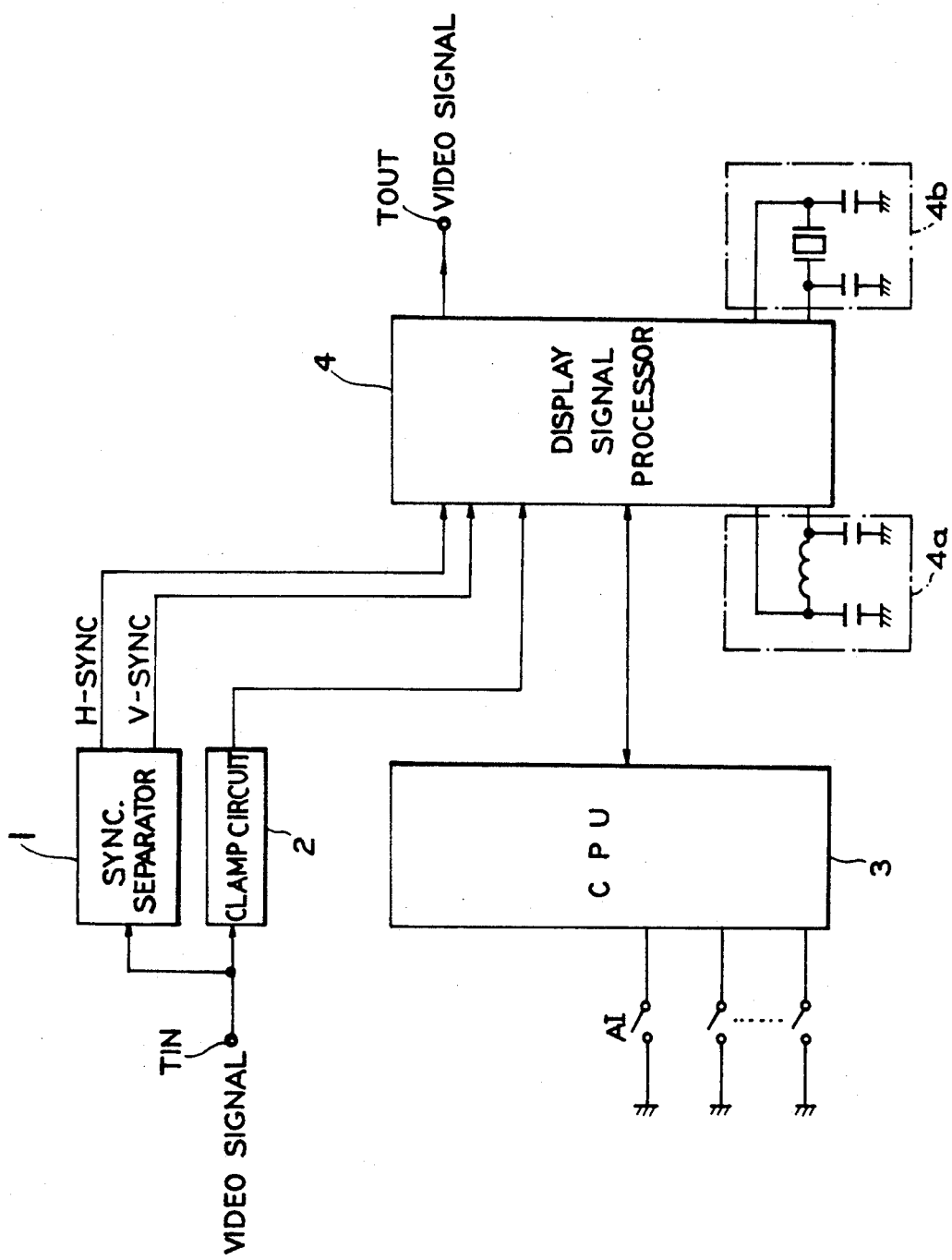
FIG. 1 is a block diagram of an image signal system of an embodiment of a video apparatus of the invention for display by animation.

FIG. 1 shows a block diagram of an image signal system of a video apparatus in a preferred embodiment of the invention. The video apparatus itself corresponds to various devices such as a monitor device, a TV receiver, a VTR, a BS tuner, a laser disk, a VTR in one unit with a monitor or the like.

In FIG. 1, the video apparatus comprises a sync separator 1 which extracts a synchronous signal (V-sync, H-sync) from video signals input from an input terminal $T_{IN}$ and outputs the synchronous signal, a clamp circuit 2 which clamps the input video signals, and a display control microcomputer (CPU) 3 which controls operation during each display processing, and particularly which can output a character signal by having a character signal generating means as hereinafter described.

The video apparatus also comprises a display signal processor (display processing IC) 4 which performs processing of a supplied video signal after clamping, a synchronous signal and a character signal, and generates a video signal in combination with an image signal and a character signal for example, and outputs the video signal after the combination from an output terminal $T_{OUT}$ to a circuit section for picture surface display drive. In addition, a display oscillator 4a and a synchronous signal generating oscillator 4b are installed externally to the display signal processor 4.

Figure 2:
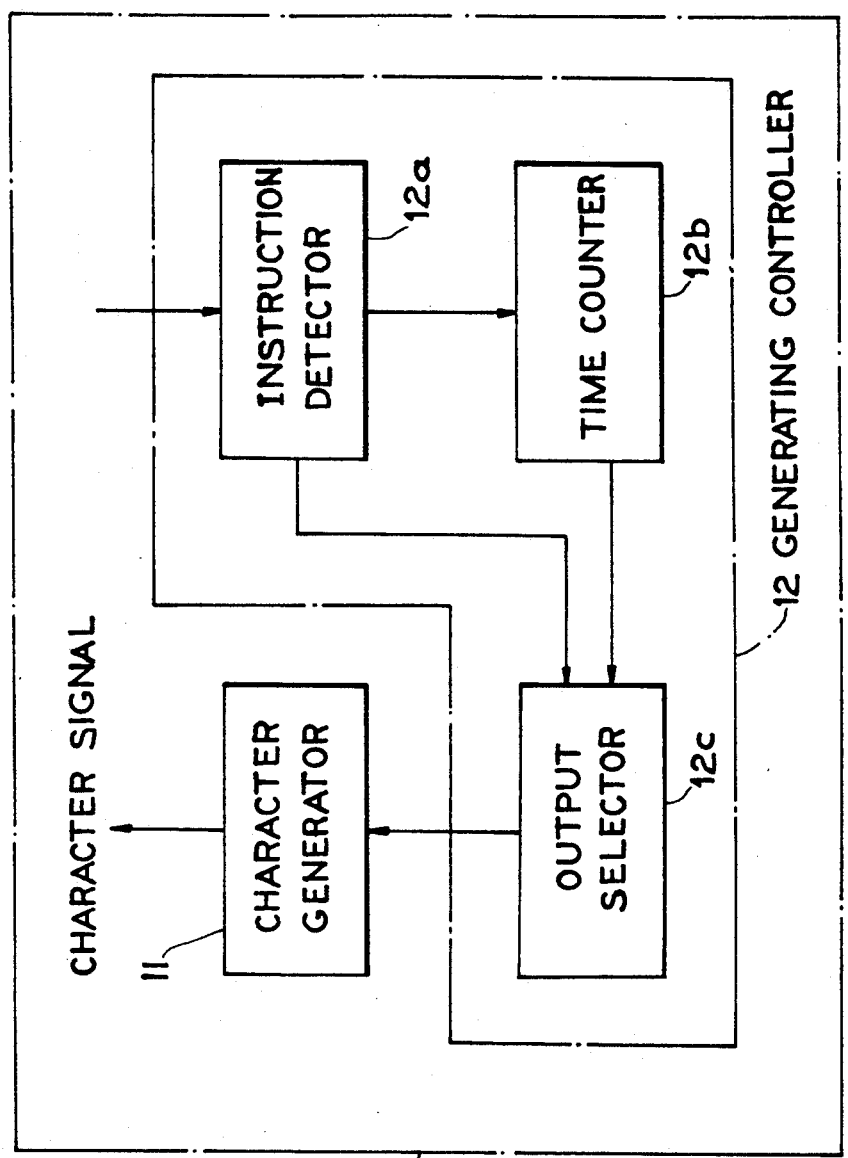
FIG. 2 is a block diagram of an example of a character signal generating means in an embodiment of a video apparatus of the invention for display by animation.

In the embodiment as above described, the CPU 3 is provided with a character signal generating means 10. As shown in FIG. 2, the character signal generating means 10 is provided with an incorporated character generator 11, and a generating controller 12 formed of an instruction detector 12a for deciding the function and operation execution mode present in the video apparatus and for outputting a character display command when the function and operation perform any character display. A time counter 12b is also provided for counting a display time of each character as hereinafter described. An output selector 12c selects characters output from the character generator 11. Each means in the generating controller 12 is formed by software.

In the video apparatus of the embodiment, a character signal output from the character signal generating means 10 is combined with an image signal in the display signal processor 4, and character display is performed on a display picture plane of a CRT monitor in one unit or a separate unit. Particularly in a mode where some function and operation are executed in the video apparatus according to control of the generating controller 12 in the character signal generating means 10, each character signal set in one set corresponding to the function and operation is output in sequence in the time division from the character generator 11. Thus the display character can express a movement on the picture plane.

The control operation will be described by way of an example of the character display in a mode where an AI (Artificial Intelligence) function is executed in the video apparatus as follows (Since the AI function itself does not have direct relation to the invention, its detailed description shall be omitted, but the function of automatic luminance setting in response to the visual-aural environment, the function of setting the optimum image contrast in response to the preceding frame, and other various functions have been proposed).

Figure 3:
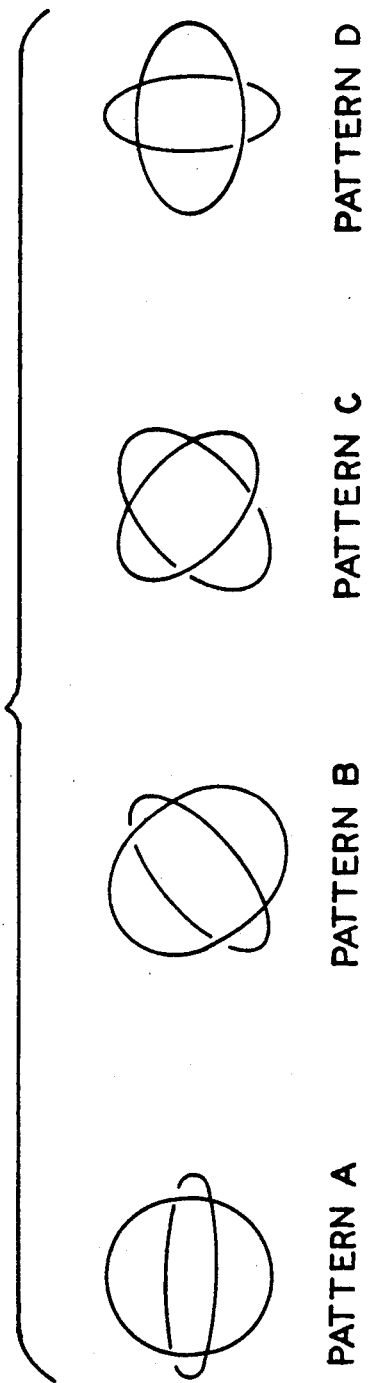
FIG. 3 is an explanation diagram of characters generated by the character signal generating means in an embodiment of a video apparatus of the invention for display by animation.

In the character generator 11, as characters to be displayed at the AI mode state, for example, characters in four units (marks in a puzzle ring) as shown in FIG. 3 are prepared in one set. Each character is distinguished in pattern A–pattern D for convenience of the description.

Figure 4:
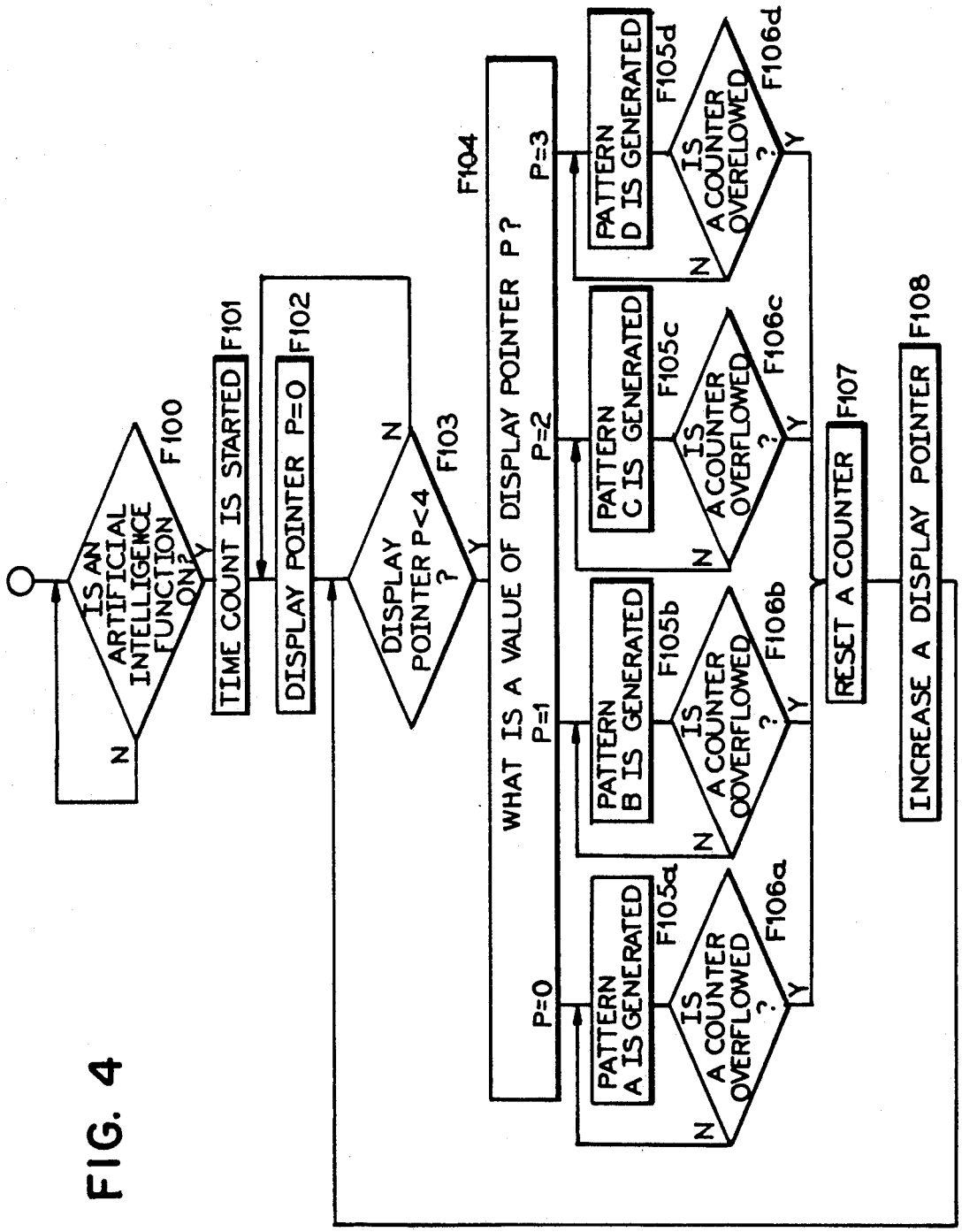
FIG. 4 is a flow chart illustrating operation of an embodiment of a video apparatus of the invention for display by animation.

In the character signal generating means 10, when the AI function is rendered on, the operation shown in steps F100–F108 of a flow chart of FIG. 4 is executed, and characters indicating the AI function mode are displayed on the picture plane.

That is, if it is detected at step F100 that the AI function is to be rendered on in the instruction detector 12a, the count is started in the time counter 12b (F101), and the output selector 12c first performs control so that the character generator 11 outputs the pattern A. That is, the display pointer is made P=0 in the output selector 12c (F102-F104). Thus the character generator 11 assigns the pattern A among patterns A-D prepared corresponding to the AI function and outputs the pattern A F105a). The pattern A is displayed together with the image on the picture plane as shown in FIG. 5A.

During the operation, the time count is executed in the time counter 12b, and the output of the pattern A is continued until the count time attains a prescribed time (F106a, F105a). In this case, the count value of the time counter 12b is set to be overflowed by six fields (1/10 sec) of the image signal, for example.

When the counter is overflowed, namely, at the stage that the pattern A is output, for example for 1/10 sec, then pattern B is output and displayed as shown in FIG. 5B. That is, after the counter is overflowed, the time counter 12b is reset and starts the count again (F107), and in the output selector 12c, the display selector is incremented (F108). Consequently the display selector becomes P=1, and in accordance with the display selector, the pattern B is selected in the character generator 11 (F104→F105b).

The pattern B is output for a prescribed time (e.g., 1/10 sec) in similar manner to the pattern A, and then pattern C and pattern D are also assigned and output respectively for 1/10 sec (F105c, F106c) (F105d, F106d), and is displayed as shown in FIGS. 5C, 5D. Furthermore after the pattern D, namely when the display selector becomes P=4, the display selector P is reset to 0 (F103→F102), and the pattern A is output again, and so forth. Each pattern is output in sequence.

In the character signal generating means 10, for example, the operation is performed in this manner. Thus the character display state shown in FIGS. 5A-5D is rapidly changed on the picture plane. For example, during the AI mode, characters indicating the AI mode (marks of a puzzle ring of FIG. 3) are expressed as if they were rotated on the picture plane.

Although not shown in the flow chart of FIG. 4, the character display (display by the patterns A-D) is performed in that after the AI function is rendered on, the display is performed, for example for 5-10 seconds, and is then finished.

The embodiment is exemplified in a character display corresponding to the state that the AI function is executed in the video apparatus. However, the invention may be applied, of course, to characters displayed corresponding to the execution state of not only the AI functions but also other function and operations, and the patterns may be set so that features of the functions and operations are expressed more effectively in respective cases. For example, when the video apparatus is a VTR device, patterns A-C as shown in FIG. 6 are set corresponding to the quick feed operation and are repeatedly displayed in sequence. Thus a more effective expression can be made of the tube surface display indicating the quick feed operation. In the case of the display of the quick feed operation, the character display is not finished in about 5-10 seconds as in the AI display. Rather it is preferred that the display is continued until finishing of the quick feed operation. The character display time may be set in accordance with a property of the function and operation.

Thus in the embodiment, the movement is added to the character, display by a plurality of characters (each pattern) corresponding to some function and operation. Thus the power of expression is increased and the viewer can more thoroughly understand and recognize the functions during the execution.

Also, since the speed of the movement is determined by setting a unit display time of each pattern (for example, 1/10 sec exemplified in the AI display), the overflow time in the time counter 12a is set variable to the prescribed time by control of the instruction detector 12a. Thus the speed of the movement of the character can be varied and the power of expression of each function can be improved.

Conventional characters in a non-movement state also can be, of course, displayed.

As above described, in a video apparatus of the invention, since character signals of a plurality of patterns are output in sequence in the time series as characters to express some function and operation of the video apparatus, the character displayed on the picture plane can be expressed. Thus the power of expression of the character is increased and the viewer can easily understand various functions and operations of the video apparatus.

Although various minor changes and modifications might be proposed by those skilled in the art, it will be understood that I wish to include within the claims of the patent warranted hereon all such changes and modifications as reasonably come within my contribution to the art.

What is claimed is:

1. A video apparatus for displaying functions by animation, comprising:
   an instruction detector means for detecting a type of instruction;
   a time counter means for counting a predetermined number of counts;
   an output selector means for generating select signals by receiving output signals of said time counter means;
   a character generator means for generating character signals based on said select signals and comprising a plurality of related patterns, which, when output in sequence from the character generator means, provide animation; and
   means for displaying said character signals.

2. A video apparatus according to claim 1 further comprising:
   a clamp circuit means for clamping an input video signal;
   a synchronous signal separator means for separating synchronization signals from said input video signal; and
   a display signal processor means for creating an output video signal by using said synchronization signals of said synchronization signal separator means, a clamped video output signal of said clamp circuit means, and the character signals of said character generator means.

3. A video apparatus according to claim 1 wherein said means for displaying comprises a television receiver, and said character signals are displayed on a display means of said television receiver.

4. A method for generating video animation, comprising the steps of:
   starting a time count;
   setting a display selector to zero;

judging whether a value of said display selector is smaller than a predetermined value or not;

detecting a number of said display selector;

generating a predetermined pattern from a character generator;

detecting an overflow of a counter;

resetting the counter; and incrementing said display selector and generating another pattern, the patterns being related to one another so that when they are output in sequence, they provide an animation effect.

5. A video animation generating method according to claim 4 wherein said detected number of said display selector is equal to or greater than 2, and said generated patterns describe a motion picture as an animation.

6. A video apparatus for displaying functions by animation, comprising:

an instruction detector means for detecting an instruction for setting a speed of display for each of a plurality of patterns to be employed in providing the animation;

a time counter means for counting a predetermined number of counts for determining a time by which each pattern is displayed, said time counter means being set by an output from said instruction detector means setting the speed; and animation signal generating means connected to receive counts from said time counter means and for generating character signals representing a plurality of sequential patterns each differing from one another, which, when output in sequence, provide animation signals.

7. A video apparatus according to claim 6 wherein means is provided for combining the animation signals with video signals so as to display functions by animation as part of the video signal.

* * * * *